United States Patent [19]
Watanabe et al.

[11] Patent Number: 6,094,191
[45] Date of Patent: Jul. 25, 2000

[54] KEYBOARD AND AN INFORMATION PROCESSING APPARATUS

[75] Inventors: Goro Watanabe; Hideyuki Motoyama; Motonobu Kawarada, all of Akashi, Japan

[73] Assignee: Fujitsu Limited, Kanagawa, Japan

[21] Appl. No.: 08/818,727

[22] Filed: Mar. 14, 1997

[51] Int. Cl.[7] ................................................ G09G 5/00
[52] U.S. Cl. ............................................ 345/168; 345/169
[58] Field of Search .................................. 345/168, 169, 345/157, 158

[56] References Cited

U.S. PATENT DOCUMENTS

| | | | |
|---|---|---|---|
| 5,287,245 | 2/1994 | Lucente et al. | 345/168 |
| 5,519,569 | 5/1996 | Sellers | 345/168 |
| 5,594,618 | 1/1997 | Sellers | 345/168 |
| 5,635,928 | 6/1997 | Takagi et al. | 345/168 |
| 5,659,307 | 8/1997 | Karidis et al. | 345/168 |

FOREIGN PATENT DOCUMENTS 8-54964  2/1996  Japan .

*Primary Examiner*—Matthew Luu
*Attorney, Agent, or Firm*—Armstrong, Westerman, Hattori, McLeland & Naughton

[57] ABSTRACT

A keyboard including a housing unit for slidably supporting a key top; and a support panel unit carrying a switch to be operated by the key top. The housing unit can move between a first position apart from the support panel unit and a second position close to the the support panel unit, and the first position is such that the key top vertically shifting from but confronting the switch, when pressed, can operate the switch, and the second position is such that the key top being horizontally deviated from the switch, even if pressed, cannot operate the switch. The housing panel may support the elastic member for supporting the key top upon a main surface thereof, a first horizontal end of the elastic member may be fixed to the housing panel, and a second horizontal end opposite the first end of the elastic member may be movable in the horizontal direction. A switch is vertically pushed by the key top; and a support panel may hold the switch thereon, and may support the second horizontal end of the elastic member. The support panel may slide horizontally to push the second horizontal end so that the elastic member may be elastically deformed for respective center lines of the key top and the switch to substantially align each other.

7 Claims, 16 Drawing Sheets

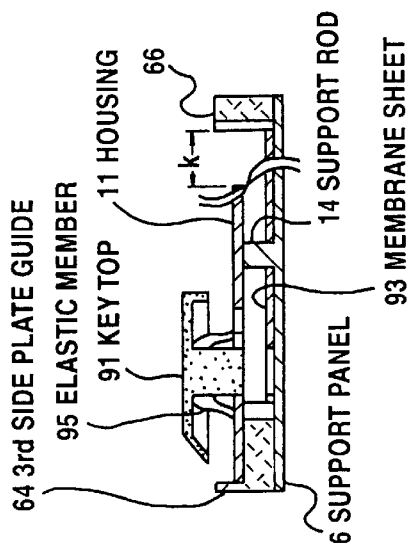
Fig. 9C
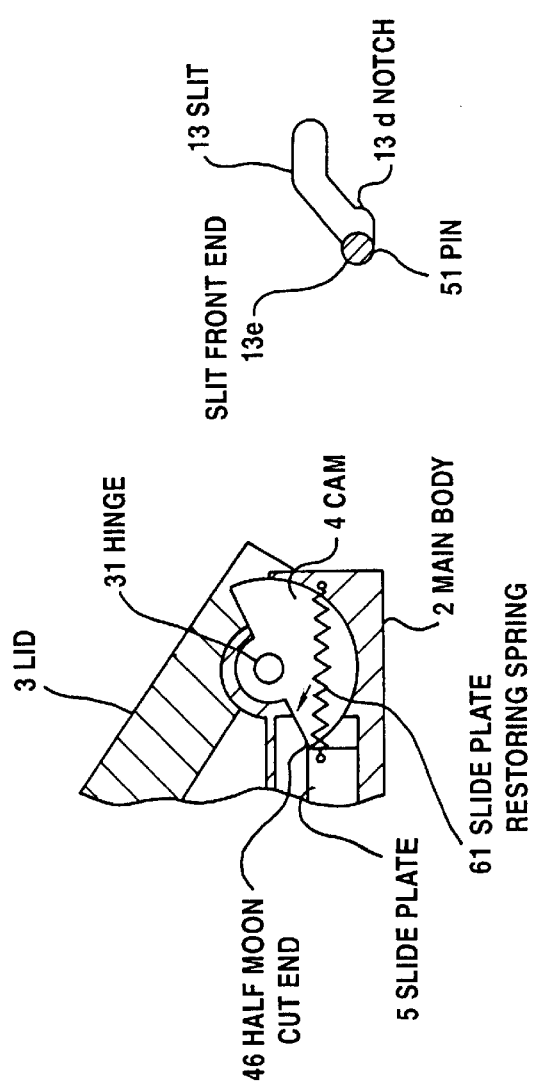
Fig. 9B
Fig. 9A

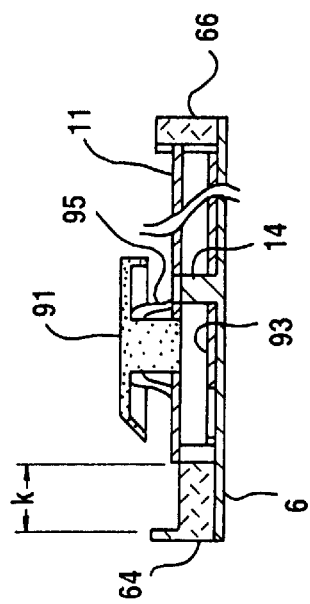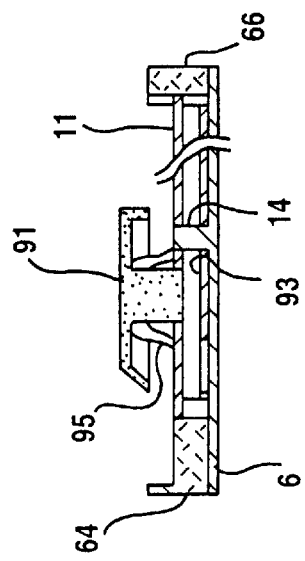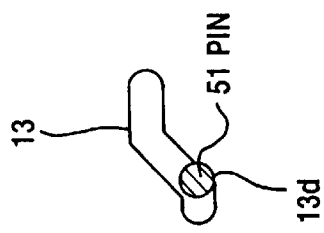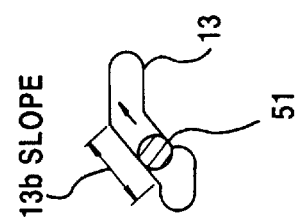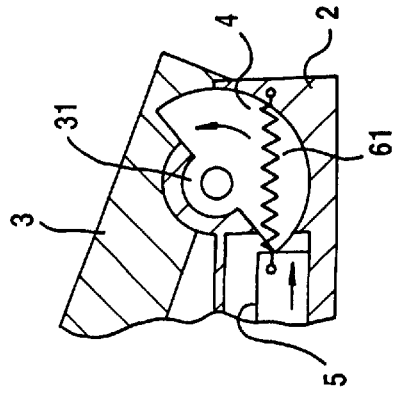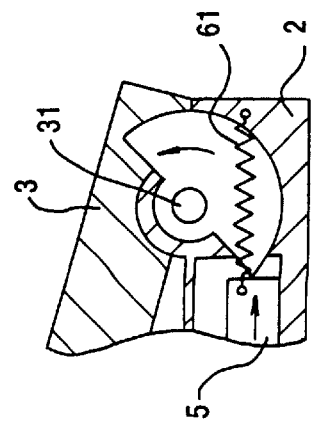

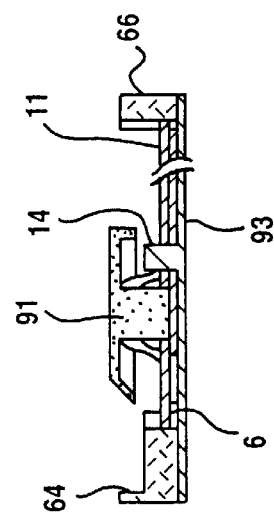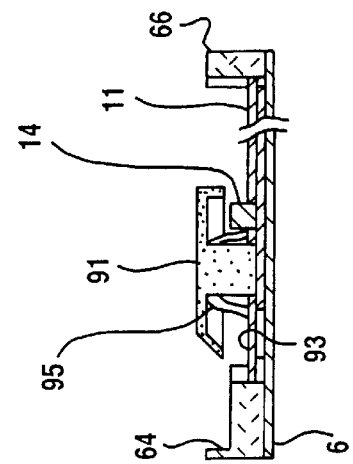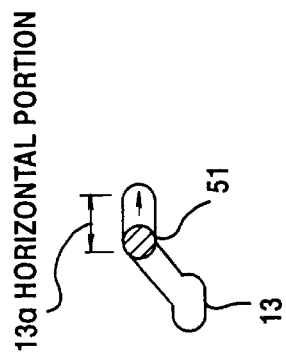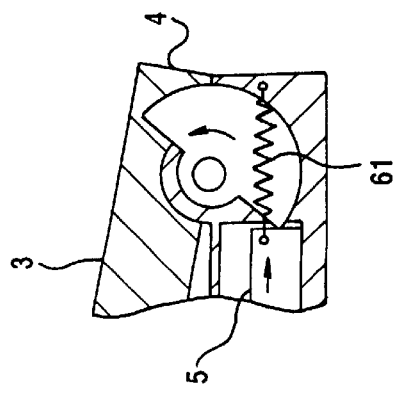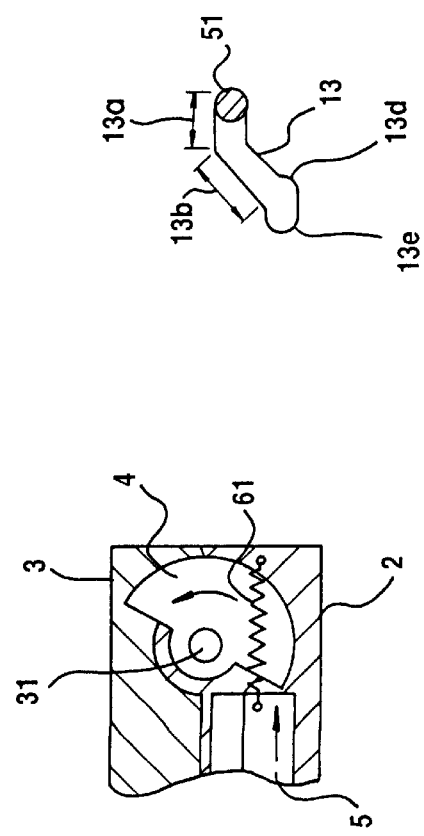

KEYBOARD AND AN INFORMATION PROCESSING APPARATUS

BACKGROUND OF THE INVENTION

1. Field of the Invention

This invention relates to a keyboard and an apparatus having the keyboard built therein used for a portable information processing apparatus, such as, for example, a notebook type personal computer or a word processor.

2. Description of the Related Art

Portable information processing apparatuses, referred to hereinafter as apparatuses, are particularly required to be easily handled when the lid is open for its operation and to be thin when the lid is closed.

There has been proposed a first solution, such as disclosed in Japanese Provisional Patent Publication Hei4-180115, where the apparatus has a lid connected to the main body via a hinge so as to freely open or close. The keyboard can ascend and descend in the main body when the lid is opened and closed, so that when the lid is opened the keyboard ascends from the inside of the main body. And, when the lid is closed the keyboard descends into the inside of the apparatus frame so as to be contained therein.

In order to meet the requirements there has been also proposed as a second solution an apparatus, such as disclosed in Japanese Provisional Patent Publication Hei8-549640. In this apparatus a vertical motion of key tops is supported and guided by a guide member, where the key tops are positioned at either of the below-described two positions by horizontally shifting a switching member carrying the guide member:

1) The key tops are positioned at a switching position, that is, the keys are in operation, when the lid is open; or 2) The key tops are positioned at a non-operating position which is lower than the switching position, when the lid is closed for being carried.

The first and second prior art apparatuses require to secure a space beforehand to contain the keyboard in the apparatus frame. Accordingly, the apparatus becomes thicker for the secured space.

A third solution is such as disclosed in Japanese Provisional Patent Publication Hei5-119884. In this apparatus is employed an air spring having the air sealed up therein, where the restoring of the pressed key is carried out with a piston and a cylinder. All of key cylinders are connected with each other via pipes so as to provide a sealed-up space, where is provided an opening/closing valve, via which there is allowed an sealing-up and an exhausting-out of the compressed air. When the air is exhausted there is no air in the sealed space so that all the key tops come down to the lowest position. When thekey board is in use, the air is introduced into the sealed space so that the keys come up to the highest position.

However, in this prior art apparatus, the keyboard not in use is at the lowest position due to the air exhausted. Therefore, the contacts of the key key switches are kept closed. As a result of keeping the contacts closed, the contacts are deteriorated.

A fourth solution is such that, when the apparatus is carried with the lid closed the lid pushes the keys so deeply as to fully depress the keys, whereby the apparatus becomes thin by this pushing-down stroke. However, in this prior art apparatus thus thinned by depression of the keys by the closing stroke of the lid, the spring for restoring the depressed key is also always compressed, resulting in fatigue.

SUMMARY OF THE INVENTION

It is a general object of the invention to provide a thin and convenient portable apparatus containing a keyboard but requiring no space for containing a spring member therein and without always pushing the key contacts so that the key contacts are prevented from fatigue.

It is another object of the invention to provide a thin and convenient portable apparatus where a spring for restoring the key is prevented from fatigue as a result of no pressing force on the key when the apparatus is in a portable use.

A keyboard of the present invention comprises: a housing unit for slidably supporting key tops; and a support panel unit carrying switches to be operated by the key tops; wherein the housing unit can move between a first position apart from the support panel unit and a second position close to the support panel unit, wherein the first position may be preferably such that the key tops vertically shifting from but confronting the switch, when depressed, can operate the switch, and the second position may be preferably such that the key top horizontally deviated from the switch contacts, even if depressed, cannot operate the switch.

The housing panel may support upon a main surface thereof an elastic member for supporting respective key top, a first horizontal end of the elastic member may be fixed to the housing panel, a second horizontal end opposite from the first end of the elastic member may be movable in the horizontal direction; a switch is vertically pushed by the key top; and a support panel may hold the switch thereon, and may support the second horizontal end of the elastic member, wherein the support panel may relatively slide horizontally to push the second horizontal end so that the elastic member may be elastically deformed so that the center line of each of the key top and the switch are substantially aligned with each other.

The above-mentioned features and advantages of the present invention, together with other objects and advantages, which will become apparent, will be more fully described hereinafter, with references being made to the accompanying drawings which form a part hereof, wherein like numerals refer to like parts throughout.

A BRIEF DESCRIPTION OF THE DRAWINGS

FIG. 1 schematically illustrates a decomposition perspective view of a portable information processing apparatus where the present invention is embodied;

FIG. 2 schematically illustrates a decomposition perspective view of the portable information processing apparatus carrying a key board of the present invention;

FIG. 3 schematically illustrates a decomposition perspective view of a structure of a slide plate unit;

FIG. 4 schematically illustrates a decomposition perspective view of a structure of a side plate unit;

FIG. 5 schematically illustrates a slit on the side plate;

FIG. 6 schematically illustrates a cross-sectional cut view of a structure of a housing unit and a support panel unit;

FIG. 7 schematically illustrates a perspective view of an assembling structure of the housing unit;

FIG. 8 schematically illustrates a cross-sectional cut view of a keyboard;

FIG. 9 to FIG. 13 schematically illustrate positional transitions in ascending/descending notion of the key board;

FIG. 14 schematically illustrates a decomposition perspective view of a second preferred embodiment of the present invention;

FIG. 15 schematically illustrates a perspective view of the relation between the slide plate and the housing unit of the second preferred embodiment;

FIG. 16 schematically illustrates a cross-sectional cut view of a state to start ascending the keyboard of the second preferred embodiment;

FIG. 17 schematically illustrates a cross-sectional cut view of a state to finish ascending the keyboard of the second preferred embodiment;

FIG. 18 schematically illustrates a cross-sectional cut view of a key switch unit of the third preferred embodiment when the lid is closed;

FIG. 19 schematically illustrates a plan view of the key switch unit when the lid is closed;

FIG. 20 schematically illustrates a perspective view of a leaf spring shown in FIG. 19;

FIG. 21 schematically illustrates a cross-sectional view of the key switch unit shown in FIG. 19 when lid is open;

FIG. 22 schematically illustrates a plan view of the key switch unit shown in FIG. 21 when the lid is open;

FIG. 23 schematically illustrates a perspective view of the leaf spring shown in FIG. 21 when the lid is open;

FIG. 24 schematically illustrates a cross-sectional view of the apparatus of the third preferred embodiment when lid is closed;

FIG. 25 schematically illustrates a cross-sectional view of the apparatus of the third preferred embodiment when lid is open; and FIG. 26 schematically illustrates a cross-sectional view of the key top unit at the state where the key top is pressed down.

DESCRIPTION OF THE PREFERRED EMBODIMENT

Preferred embodiments of the present invention are hereinafter described referring to drawings.

Figure 1:
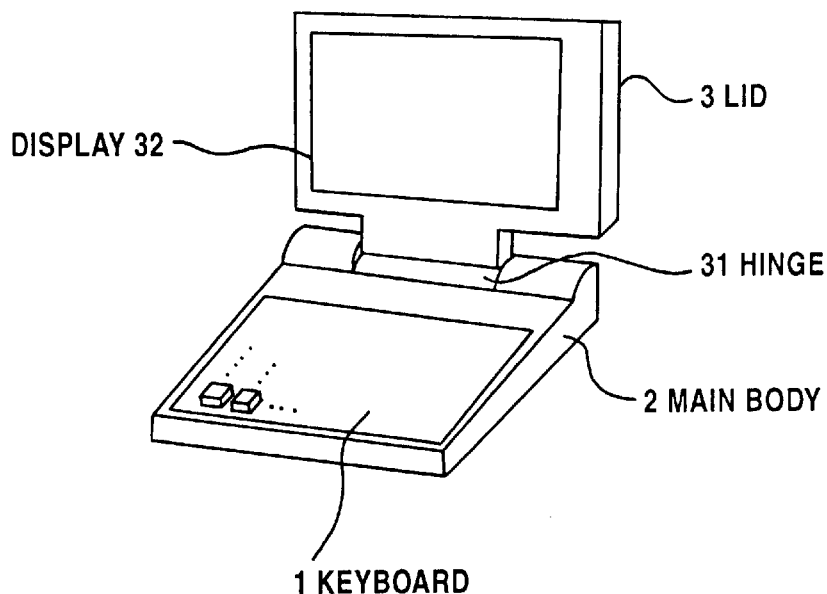

FIG. 1 schematically illustrates a notebook-type portable information processing apparatus, referred to hereinafter as an apparatus, such as a personal computer and a word processor.

The apparatus is roughly divided into a lid 3 and a main body 2. Lid 3 is connected to main body 2 via a hinge 31 so that the lid rotates around the center line of hinge 31 so as to be opened and closed Hereinafter are defined the side having the hinge as a rear side, and another side confronting the keyboard operator as a front side, denoted with arrows R and F, respectively.

Lid 3 includes a display 32 inside the lid. Main body 2 is constituted with a printed circuit board carrying keyboard 1 and other electronic components.

Figure 2:
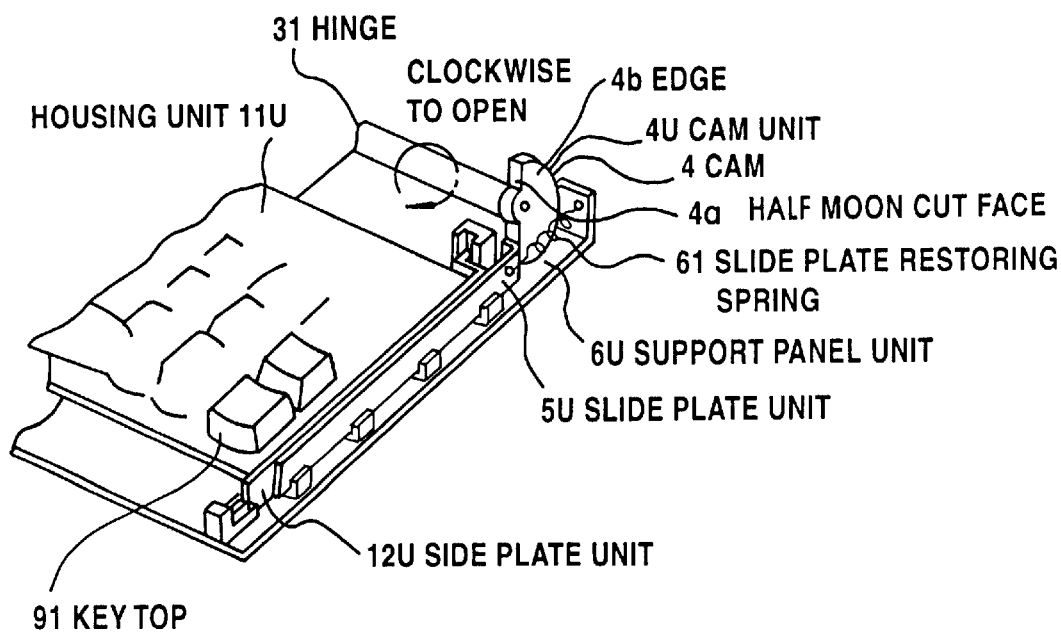

FIG. 2 schematically illustrates a decomposition perspective view of slide plate unit 6, as a first preferred embodiment of the present invention. Main body 2 includes a cam unit 4U, a slide plate unit 5U, a side plate unit 11U, a housing unit 11U and a support panel unit 6U. Moreover, keyboard 1 includes a slide plate unit 12 and housing unit 11U.

Figure 3:
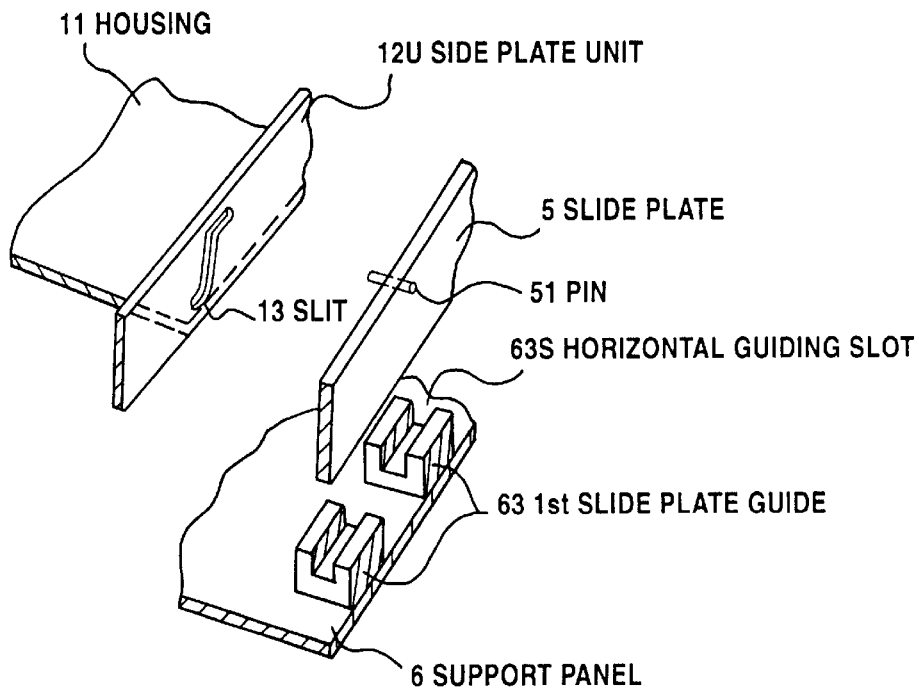
Figure 4:
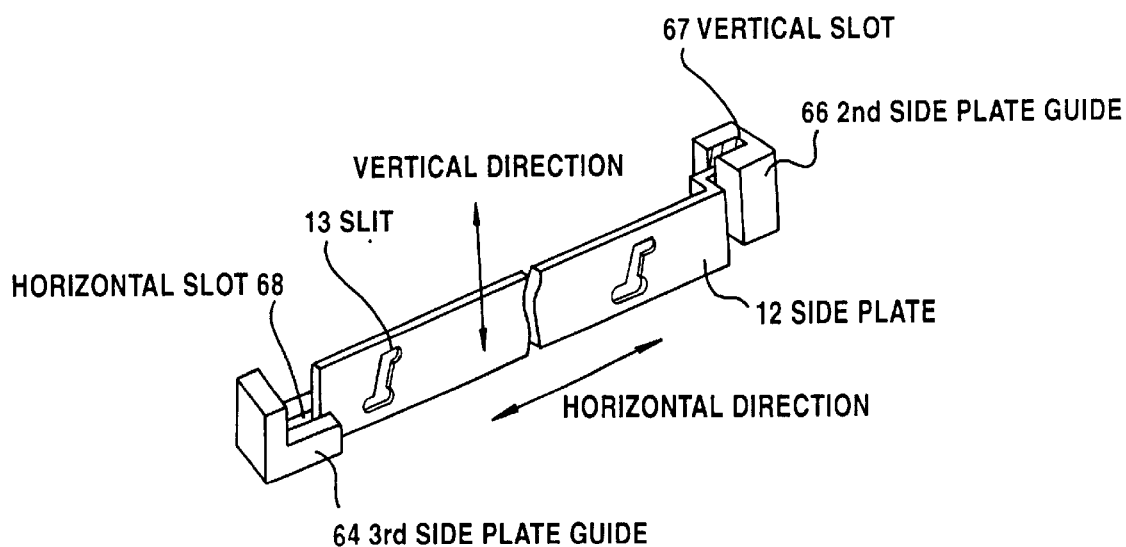

FIG. 3 schematically illustrates a decomposition perspective view of slide plate unit 5U. Slide plate unit 5U is provided with a plurality, for example, two, of pins 51 fixed on its slide plate 5 at the side to face side plate 12. Upon support panel 6 are provided plurality, which is equal to the quantity of support pins 51, of first slide plate guides 63 each having a horizontal guiding slot 63S, whereby slide plate 5 can horizontally move toward/from cam 4. In this specification the term "horizontal" indicates "along the main surface of the housing unit or the support panel".

Hereinafter described is a relation between the cam unit 4U and slide plate unit 5U more in detail. Cam unit 4U is formed with hinge 31 connected to lid 3 and to a half moon cam, each coaxially fixed to hinge 31.

When lid 3 is in a closed state, the half moon cut face 4a of cam 4 is in a face-to-face contact with side plate 5 of slide plate unit 5U. When lid 3 starts to open, i.e., to move, an edge 4b of the half moon cut face 4a is still in contact with slide plate 5 owing to the pulling force of a slide plate restoring spring 61 which pulls a rear end of slide plate 5 toward the cam.

At the rear side of main body 6 is fixed a second side plate guide 66 having a vertical slot 67. At the front side of main body 6 is fixed a third side plate guide 64 having a horizontal slot 68. Rear end of side plate 12 is slidably held in vertical slot 67. A front end, opposite from the rear end, of side plate 12 is slidably held in the horizontal slot 68. Accordingly, side plate 12 can slide along the direction, denoted with an arrow X, orthogonal to the axis of the hinge, as well as in the vertical direction, denoted with an arrow Y. Upon the side of side plate 12 are provided a plurality of almost S-shaped slits 13.

Figure 5:
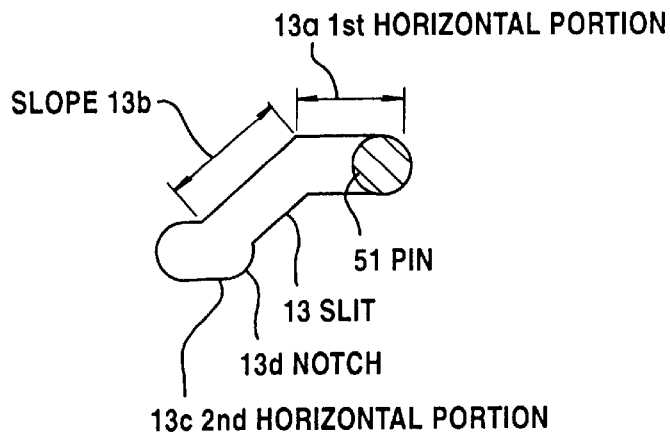

FIG. 5 schematically illustrates the relationship between slit 13 and pin 51 of the side plate 5, where lid 3 is closed. Slit 13 is formed of a horizontal portion 13a, a slope 13b, a second horizontal portion 13c and a notch 13d, where slope 13b connects between a rear end of the first horizontal portion 13a and a front end of second horizontal portion 13c. Notch 13d is in a shape such that an upper half of notch 13d is open so that a horizontal movement of side plate 12 toward the front side is not allowed, but a vertical rise of pin 51 therefrom is allowed. The width of slit 31 is such that pin 51 can slidably move therein.

Figure 6:
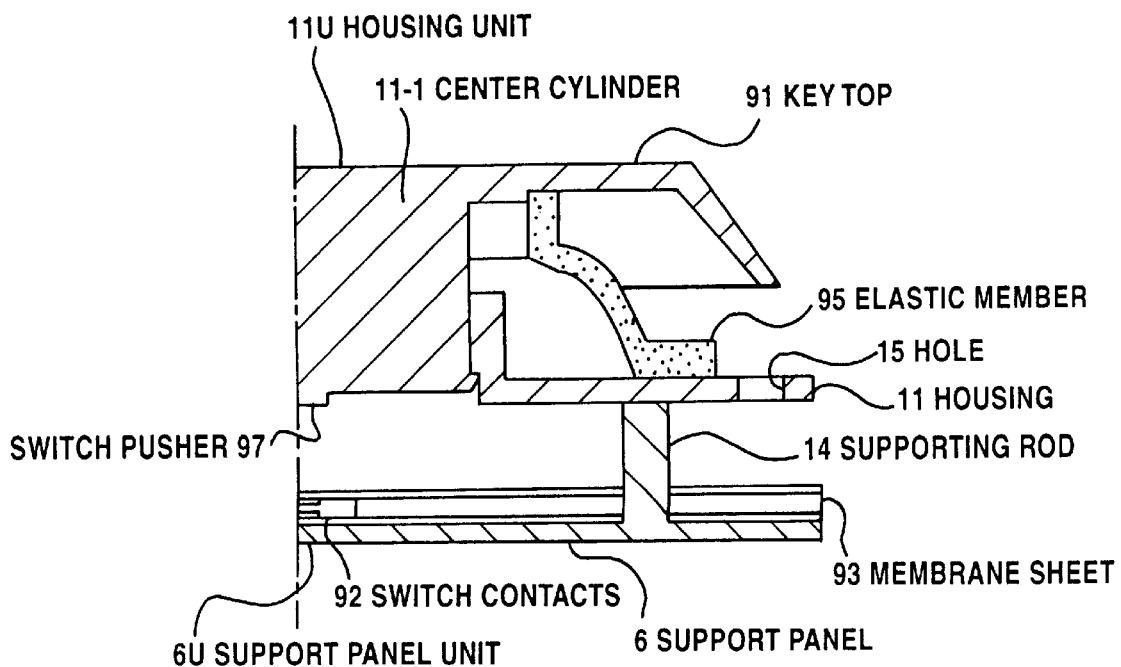

FIG. 6 schematically illustrates structures of housing unit 11U and support panel unit 6U. Support panel unit 6U is constituted with support panel 6 having typically four supporting rods 14 vertically standing on a horizontal surface of supporting panel 6, and membrane sheet 93 having upon support panel 6 a plurality of switch contacts 92.

Housing unit 11U is constituted with above mentioned housing 11 provided with four holes 15 to receive supporting rods 14 and a center cylinder 11-1 to receive key top 91, an elastic member 95 in a shape of a cup a bottom of which is larger in diameter than its top and is fixed to housing 11 and a top of which is fixed to an inner flat surface of key top 91, and membrane sheet 92 containing plural switch contacts 92, on support panel unit 6. Key top 91 has a center core portion, i.e. a plug, 91-1 vertically extending toward membrane sheet 93 so as to slidably fit into the center cylinder 11-1.

Figure 7:
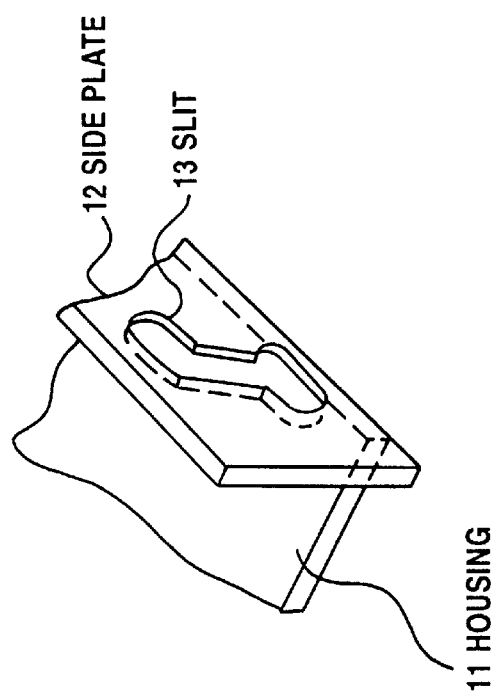

FIG. 7 schematically illustrates a perspective view showing the assembled state of housing unit, where a lower end of side plate 12 and housing unit 11U are fixed together by the use of screws, which is not drawn in the figure.

A key input operation is schematically explained by the use of structural drawing of housing unit 11U and support panel unit 6U in FIG. 6.

FIG. 6 schematically illustrates a state where lid 3 is opened from main body 2, where housing unit 11U has ascended from support panel unit 6U, in other words, keyboard 1 has ascended from main body 1.

Accordingly, there is shown a state where key top 91 is not pressed yet by a finger, etc. That is, key top 91 is located at the top dead point, referred to hereinafter as a home position, by an elastic force of elastic member 95 typically formed of silicone resin. By pushing down the upper surface of the key top 95, the key top descends guided by the plug sliding into the central hole while resisting against elastic force of elastic member 95. Finally an embossing 97, referred to hereinafter as a switch pusher, provided at the bottom center of plug 91-1 pushes switch contacts 92 to close.

Consequently, the key information input to the key is electrically transferred to a printed circuit board, which is not drawn in the drawings. Next, on leaving the finger from the upper surface of key top the key top reversely performs the above-mentioned motions back to the home position by the elastic force of elastic member 95. Then, the key contacts 92 are released by key top 91.

Figure 8:
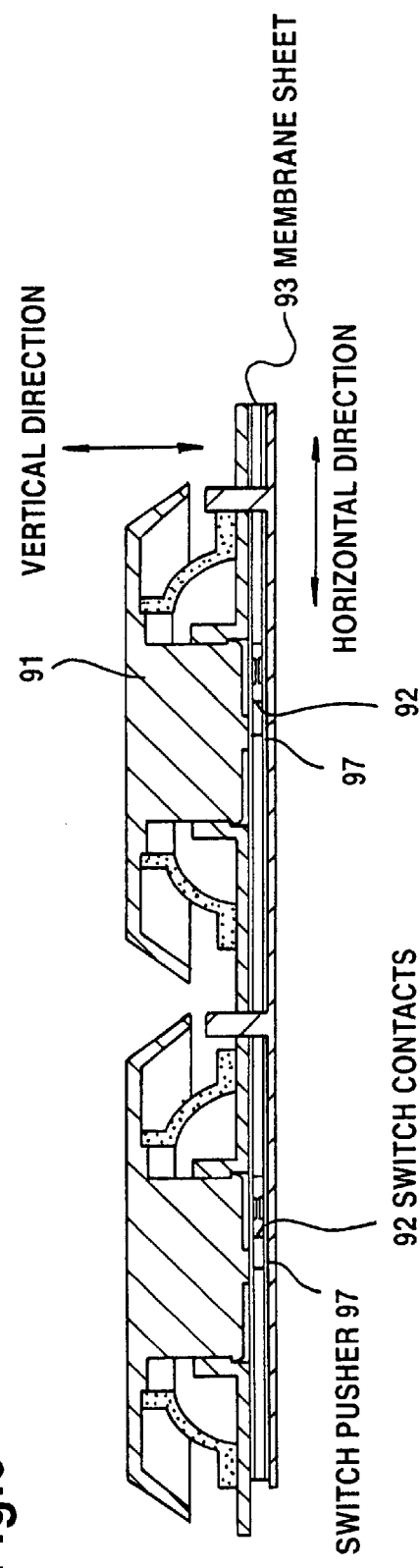

FIG. 8, a cross-sectional view of key board structure, schematically illustrates a state where lid 3 is closed onto main body. In this state switch pusher 97 is located so as to not only horizontally avoid the corresponding key contacts 92, but also to avoid other nearby switch contacts 92.

Hereinafter is described the motion of each unit of the key board. FIG. 9 to FIG. 13 are for explaining the ascending/descending motion of the key board. The figure numbers having suffix A illustrate the relation between the angular positions of cam 4 connected to lid 3 and slide plate 5. The figure numbers having suffix B illustrate the positional relation between pin 51 and slit 13. The figures numbers having suffix C illustrate the ascending/descending motion of support panel 6 in the main body and housing 11U. In FIG. 9A showing the opened state, slide plate 5 is pulled rearward by slide plate restoring spring 61 so as to contact cam 4; pin 51 is located at the deepest front end 13c of the slit as shown in FIG. 9B; and housing unit 11U is located at the highest position ascending from the support panel in main body 2 as shown in FIG. 9C. In other words, housing 11 is located at a first position apart from support panel of main body 2, where housing unit sits on supporting rods 14.

FIG. 10A schematically illustrates a state that lid 3 goes to be closing, where cam 4 also goes to rotate anticlockwise together with lid 3, and slide plate 5 goes to move rearwards. Next, pin 51 on slide plate 5 horizontally moves within slit 13 rearward until caught by notch 13d. Pin 51 further moves rearward while being caught by notch 13d, so as to finally move housing unit 11U to the deepest rear end as shown in FIG. 10C. Housing unit 11U has horizontally shifted as distant as denoted with k.

FIG. 11A schematically illustrates a state that lid 3 is further closed, where cam 4 continues to rotate anticlockwise together with lid 3; and pin 51 pushes the slope 13b rearward. However, the rear end of side plate 12 is blocked by side plate guide 66; consequently, slope 13b together with housing 11 is pushed downward by pin 51, where holes 15 are further mated with supporting rods 14.

FIG. 12A schematically illustrates a state that lid 3 is furthermore closed, where cam 4 still continues to rotate anticlockwise together with lid 3, so that slit 13 goes down until pin 51 meets the highest end of the slope 13b and housing unit 11U contacts support panel 6 of the main body as shown in FIG. 12C. At this time, supporting rods 14 provided on housing 11 completely penetrate into holes 15 provided in support panel 6.

FIG. 13A schematically illustrates a state that lid 3 is completely closed, where cam 4 has rotated anticlockwise together with lid 3, and pin 51 is located at the deepest rear end of horizontal portion 13a of the slit. The reason why horizontal portion 13a is provided is in that an idle stroke is provided as large as horizontal length 13a so that housing unit 11u may start to horizontally move when lid 3 comes to a predetermined position. Then, housing unit 11U is contained in main body 2, sitting on support panel 6 as shown in FIG. 13C. That is, housing unit 11U is located closer to support panel 6, which is called a second position. As a result, housing unit 11U moved from the highest position shown in FIG. 9 to the lowest position sitting on support panel 6. This vertically moved distance is equal to the height of supporting rod 14, that is equal to the key stroke.

Hereinafter is described a case where lid 3 is to be opened. Clockwise rotation of cam 4 allows the motions to reverse to the above-described closing motion while slide plate 5 is pulled rearward by the tension of slide plate restoring-spring 61. Consequently, housing unit 11U after being lifted moves frontward so that the lower surface of housing unit 11U sits on the upper ends of supporting rods 14.

Figure 14:
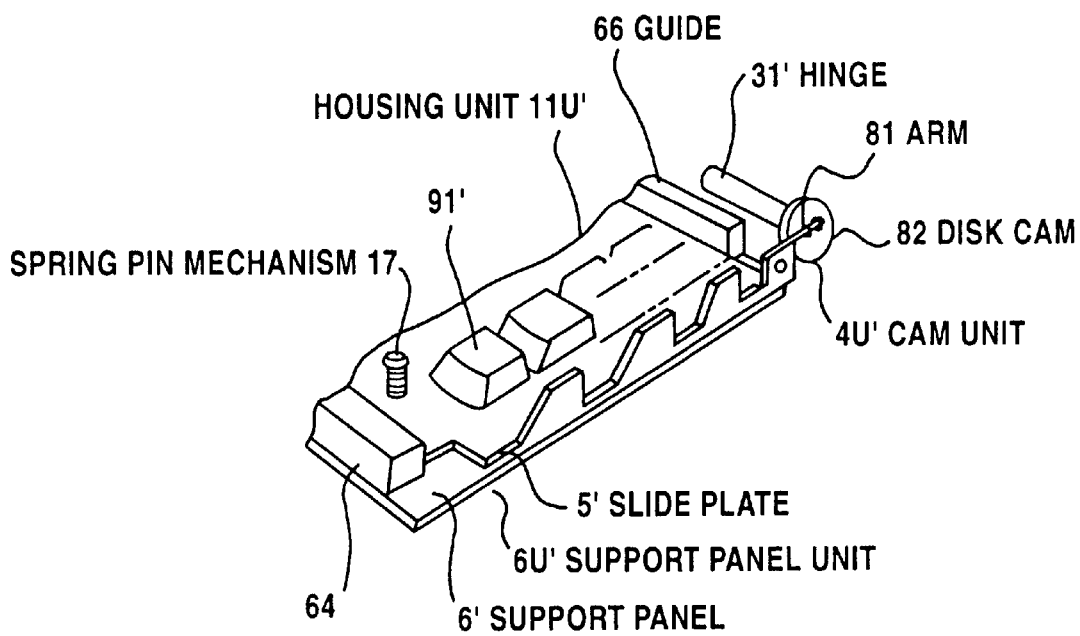

FIG. 14 schematically illustrates a perspective cut view of a keyboard of a second preferred embodiment of the present invention. Main body includes a housing unit 11U' carrying key tops 91', a slide plate 5', a spring pin mechanism 17 and guides 66 and 64 as shown in FIG. 14. A center of a disk cam 82 is fixed to a hinge 31' connected to lid 3, and that an eccentric part of the disk cam 82 is rotatably connected to slide plate 51 by an arm 81, in addition to the below-described feature.

Figure 15:
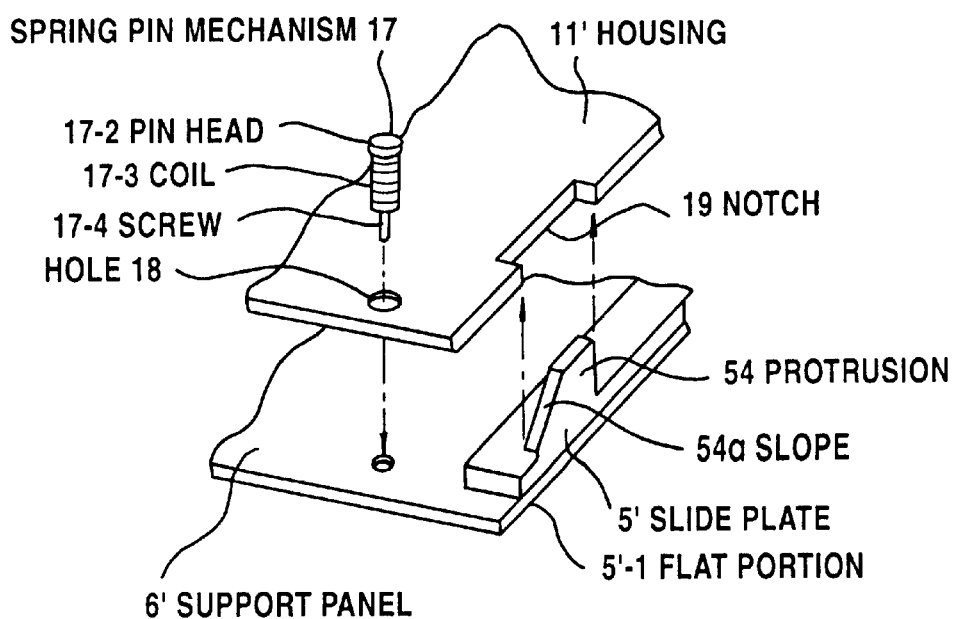

FIG. 15 schematically illustrates the relation between housing 11' and slide plate 5'. The slide plate 5' is such that a vertical side or slide plate 5' is formed with protrusions 54 which are to engage with notches 19 provided in housing 11' of housing unit 11U', and is provided with a horizontal flat portion 5'-1 orthogonal to protrusions 54 so as to be able to slide upon a support panel 6'. The shape of protrusions 54 are such that each protrusion has a slope 54a at its front side and a vertically straight side at its rear side.

Housing unit 11U' is similar to that of the first preferred embodiment in that housing unit 11U' includes key tops 91, elastic members 95' now drawn as coil springs, and housing 11', except that there is provided a plurality of notches 19 at the sides of housing 11' so as to be engaged with respective protrusions 54 of slide plate 5' instead of being fixed to side plate 12 of the first preferred embodiment, and there is also provided pin holes 18. Spring pin mechanism 17 having a screw part 17-1 and a coil spring 17-3 therearound between pin head 17-2 and housing 11. Each spring pin mechanism 17 is fixed slidably through respective pin hole 18 to support-panel unit 6U' wherein coil spring 17-3 always pushes down housing unit 11U'. Four spring pin mechanisms 17 are typically provided therein so that housing unit 11U' can smoothly move in the vertical direction.

Figure 16:
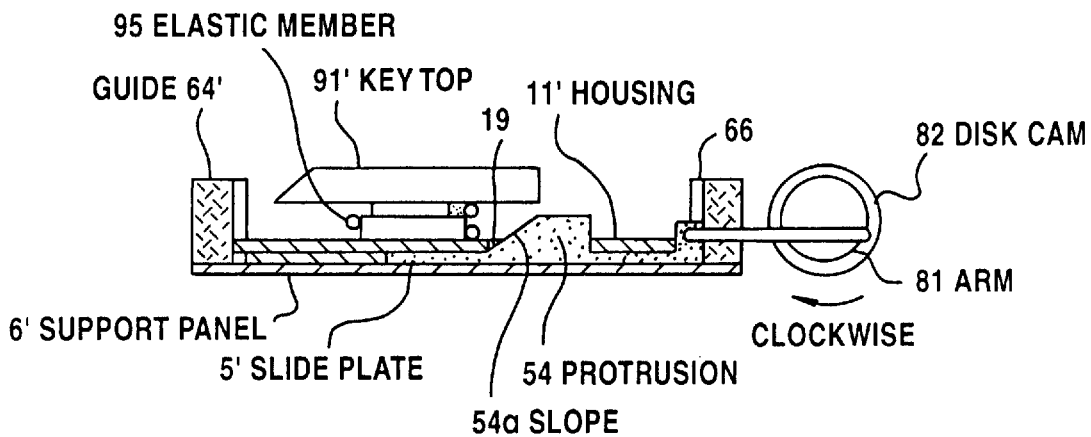

FIG. 16 schematically illustrates the positional relation between protrusion 54 of slide plate and notch 19 or housing 11' when lid 3 is closed. Housing unit 11U' is pushed down so as to be contained in main body by spring pin mechanism 17 while protrusions 54 of slide plate 5' are engaged with notches 19. In other words, housing unit 11U' is located at the second position that is close to support panel 6 of main body.

Figure 17:
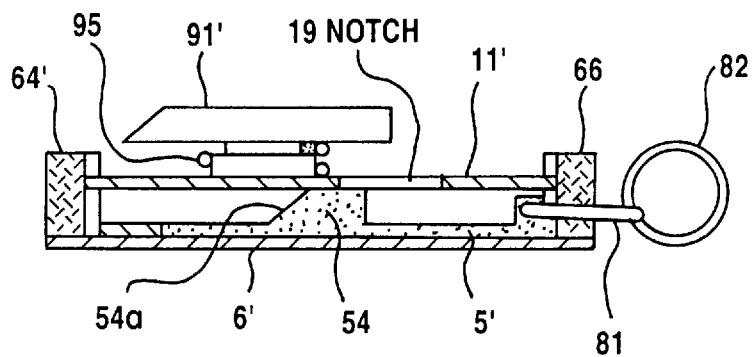

FIG. 17 schematically illustrates the state when lid 3 is open, where protrusion 54 of slide plate holds thereon housing unit 11U'. In other words, housing unit 11U' is located at the first position that is apart from support panel 6 of main body 2. The function of each component member will be described later in detail.

The opening/shutting motion of cam unit 4U', slide plate unit 5U' and housing unit 11U' is hereinafter described with reference to FIGS. 16 and 17. When lid 3 is going to open, disk cam 82 is rotated clockwise in FIG. 16 together with the rotation of hinge connected to lid 3. Arm 81 is linked to disk cam 82 so that when disk cam 82 rotates clockwise arm 81 moves frontward so as to push slide plate 5'. Housing 11' sitting on slide plate 5' cannot move frontward together with slide plate ' because the front end of housing 11' is blocked by a front guide 64', however, is allowed to slide vertically therealong. Consequently, housing unit 11U' is pushed up by the slope 54a, which pushes the front side of notch 19, to the upper end of protrusion 54. Then, slide plate 51 horizontally moves, while supporting housing 11' thereon, further frontward until the opening motion of lid 3 is finished as shown in FIG. 17.

In closing lid 3, disk cam 82 is rotated anticlockwise in FIG. 17 together with the rotation of hinge 31 so that arm 81 linked to cam 82 pulls support panel 6' rearward. Consequently, housing unit 11U' descends while contacting slope 54a by the force of spring pin mechanism 17 pushing down housing unit 11U' until sitting on support panel 6'. Thenafter, slide plate 5' horizontally moves further to a predetermined position so that housing unit 11U' can be contained into the main body.

Figure 18:
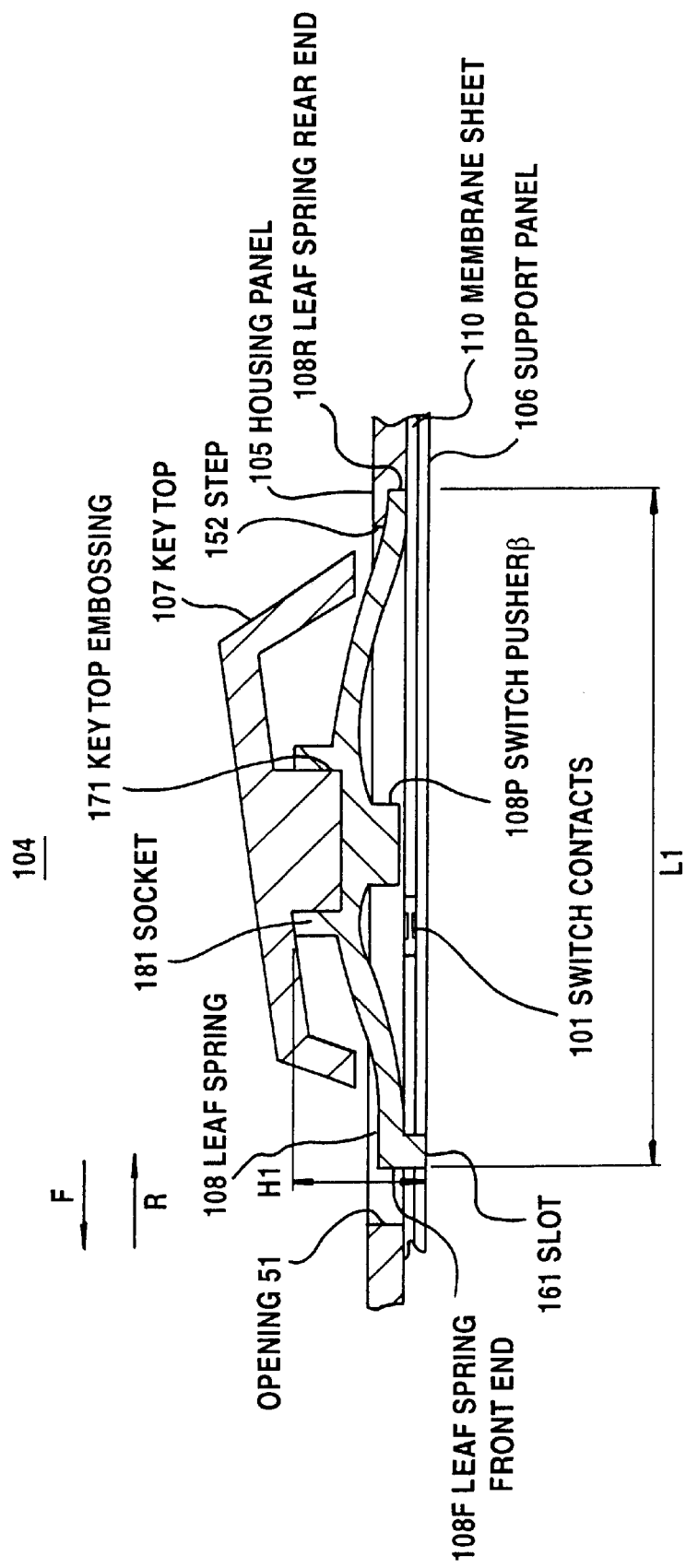

FIG. 18 schematically illustrates a cross-sectional view of a keyboard switch unit of a third preferred embodiment of the present invention when the lid is closed. Keyboard switch unit 104 is constituted with a key top 107, a spring 108, a housing panel 105, a membrane sheet 110 containing switch contacts 101 therein, and a support panel 106.

Upon membrane sheet 110 is arranged housing panel 105 capable of horizontally sliding, i.e. shifting, along the directions denoted with arrows R and. F, representing "rearward" and "frontward", respectively. Beneath membrane sheet 110 is arranged support panel 106. Key top 107 has a main surface 107a which the operator's finger is to touch, and has a key top cylinder 171. Spring 108 has an embossing as a switch pusher 108P at the bottom center. Spring 108 is connected with key top by inserting the key top cylinder 171 of key top into a socket 181 provided at a center top of spring 108. Spring 108, typically a leaf spring, has only to be of an elastic material in a rectangle shape, such as a metal or a rubber material. Spring 108 and key top 107 may be unitedly formed, such as a molding. A rear end 108R of the leaf spring is fixed to beneath a step 152 provided at an opening 151 of housing panel 105. A front end 108L of the leaf spring pierces membrane sheet 110 so as to be inserted into a slot 161 and fixed therein. At this state, a center line of switch pusher 108P and a center line of switch contacts 101 on membrane sheet 110 are arranged so as not to line up, in other words, horizontally deviated from each other by a distance x, and the height of the key top is adequately low to be contained in the main body owing to the almost flat spring 108. Therefore, leaf spring 108 or switch contact 101 is not pressed by the key even when the lid is closed during a carrying use, whereby leaf spring 108 and switch contacts 101 can be prevented from their fatigue.

Figure 19:
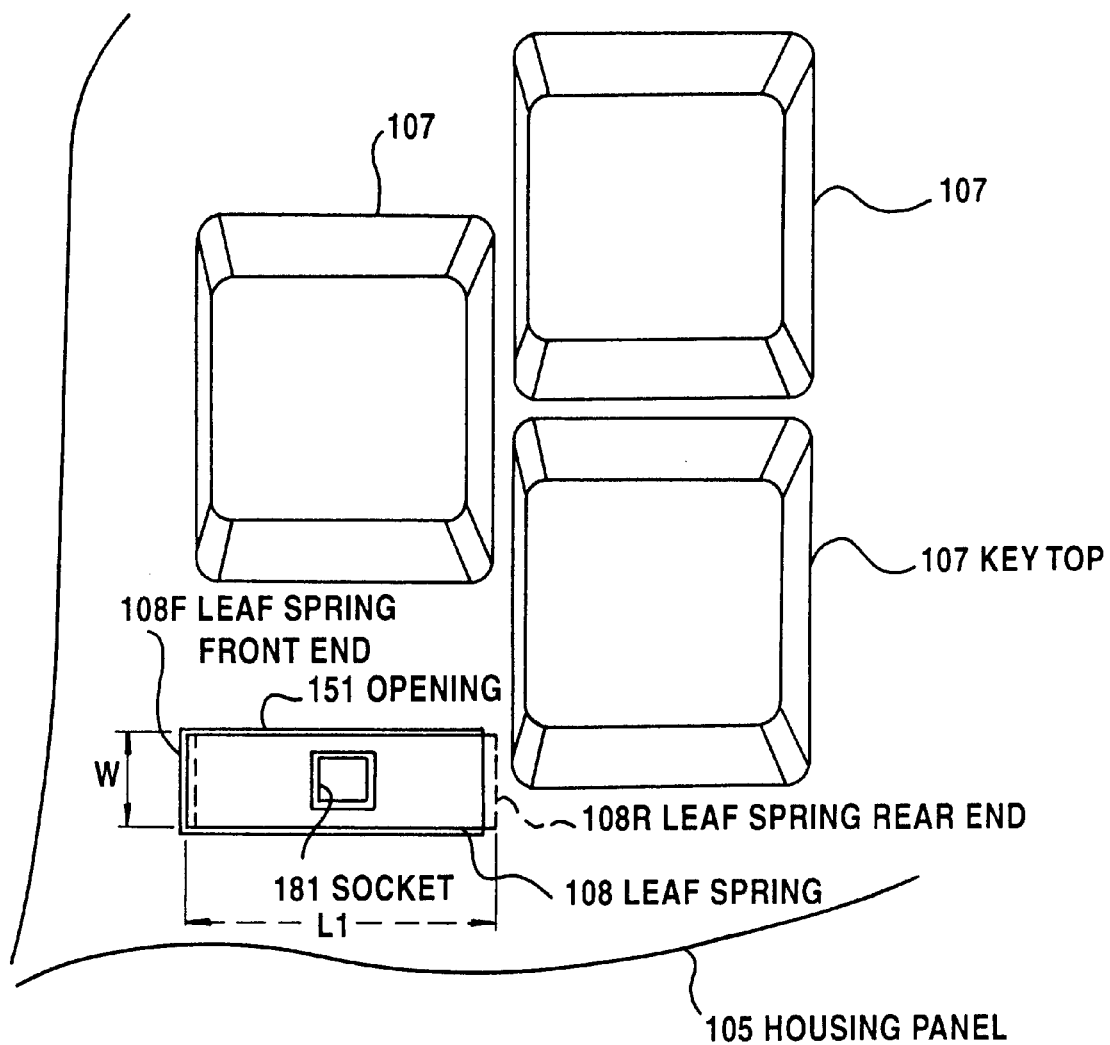

FIG. 19 schematically illustrates a plan view of key switch unit 104 when the lid is closed. Housing panel 105 has openings 151 of an rectangle shape as many as the quantity of the keys. Within each of openings 151 is located the above-mentioned key switch unit 104. Opening 151 has a width W, typically 4 mm, almost equal to the width of leaf spring 108. Length L1 of opening 151 is typically 10 mm, almost equal to the length of leaf spring 108. Within each opening 151 is located the above-mentioned leaf spring 108.

Figure 20:
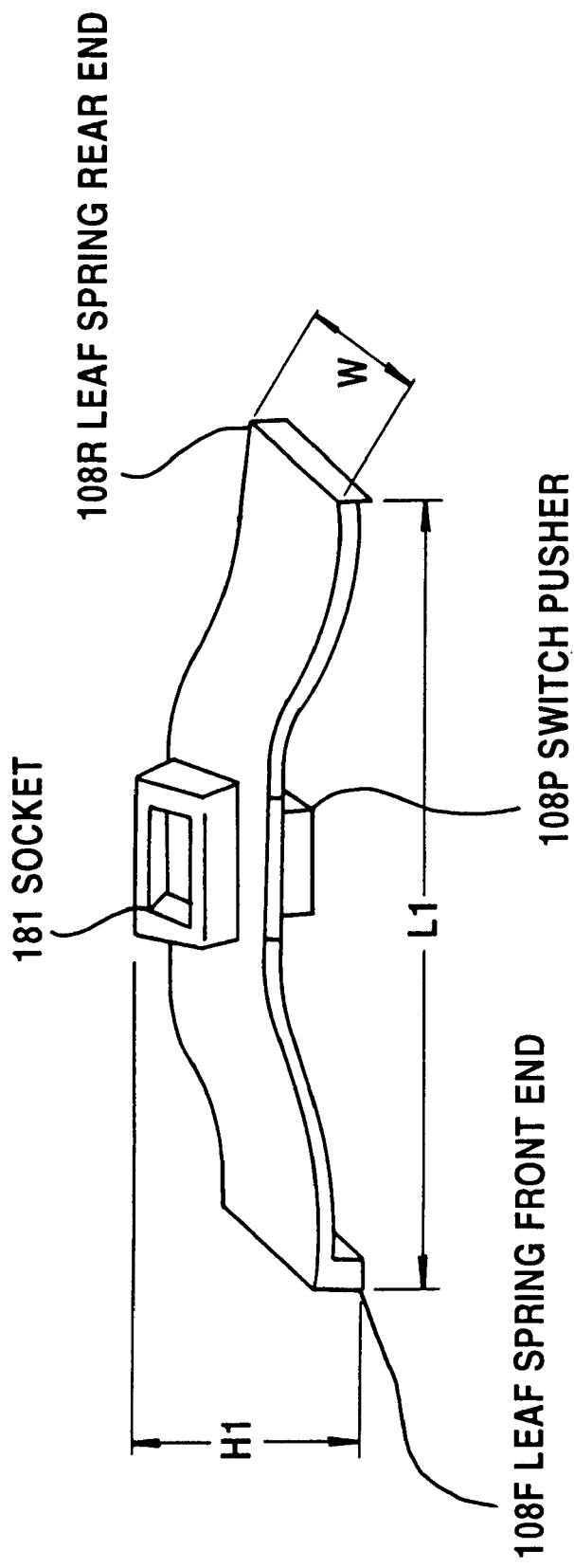

FIG. 20 schematically illustrates a perspective view of the leaf spring when the lid is closed. At this state, the span L1 between rear end 108R and front end 108F, respectively of leaf spring 108, is typically 10 mm. A height H1 of a socket 181 measured from the bottom of spring 108 is typically 1.5 mm. The shape of leaf spring 108 is now a little-raised flat having a gradual hill around switch pusher 108P.

Figure 21:
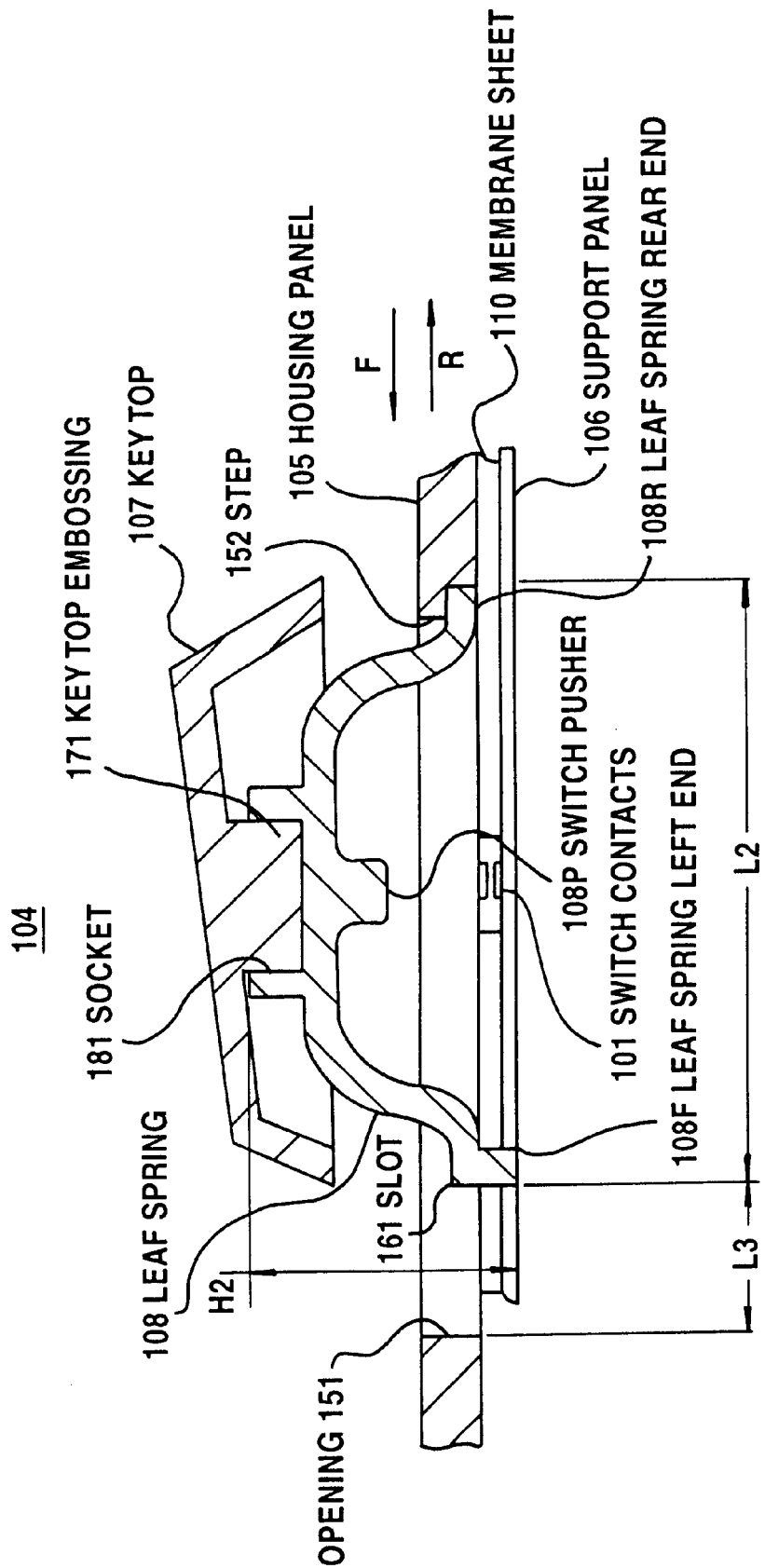

FIG. 21 schematically illustrates a cross-sectional view of the leaf spring when the lid is open, where similarly to FIG. 18 right hand end 108L of the leaf spring is fixed to support panel 106, and right band end 108R of the leaf spring is fixed to housing panel 105.

In opening the lid, the above-mentioned housing panel 105 horizontally shifts to F direction along the arrow F. As a results rear end 108R of the leaf spring shifts by L3, typically 4 mm, to F direction. Consequently, leaf spring 108 is deformed into a mountain shape symmetrical with respect to switch pusher 108P located at the bottom center as shown in FIG. 21. Then, the span between rear end 108R and front end 108L becomes L2, typically 6 mm. Between front end 108L and the front end of the opening is a clearance L3, typically 4 mm. In this state, it is arranged that the center line of switch pusher 108P lines up with switch contacts 101 of membrane sheet 110 so that switch contacts 101 can be operatively pushed by switch pusher 108P, in other words, the key switch unit is ready to operate.

Figure 22:
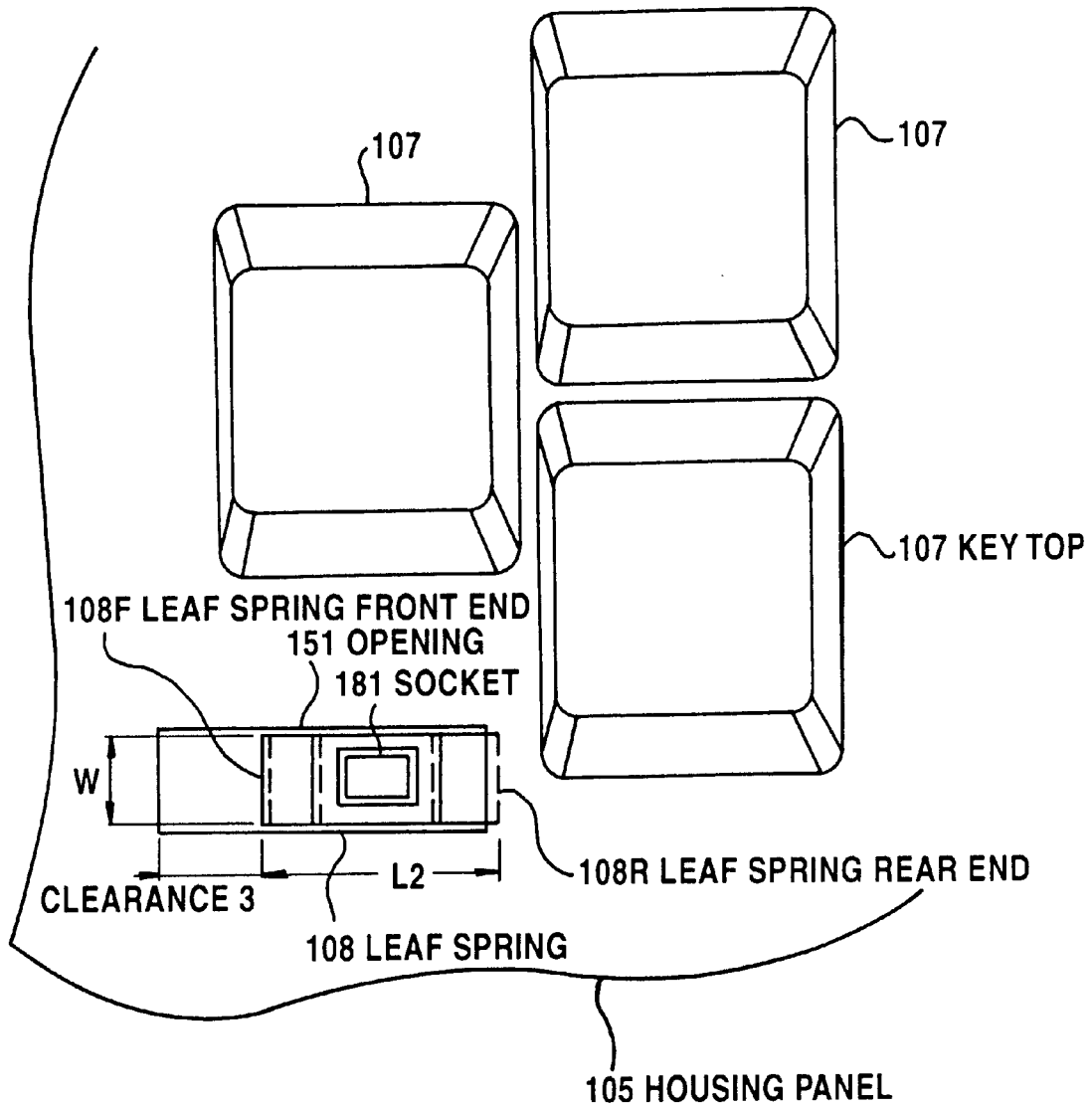
Figure 23:
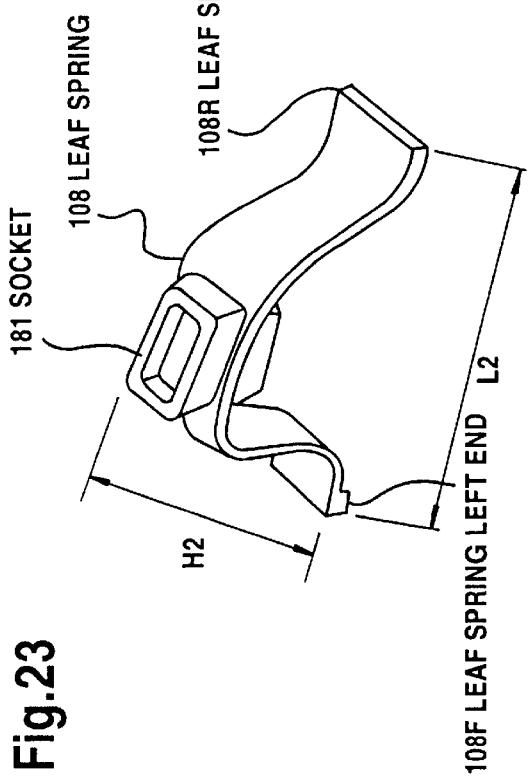

In FIG. 22 and FIG. 23 are schematically illustrated respectively a plan view and a perspective view of key switch unit 104 when the lid is open. That is the state where the above-mentioned housing panel 105 has horizontally shifted toward the arrow F direction so as to shift rear end 108R of the spring by toward the arrow F direction. Accordingly, there is a clearance L3, typically 4 mm, between front end 108F and the end of opening 151.

A clearance L2 between the spring's rear end 108R and the spring's front end 108F is now 6 mm. And, the height H2 of the socket top measured from the spring's lowest bottom is now 4 mm. That is, by shrinking the span L1, 10 mm, to L2, 6 mm, the height H1 is increased from 1.5 mm to H2, 3.8 mm.

Figure 24:
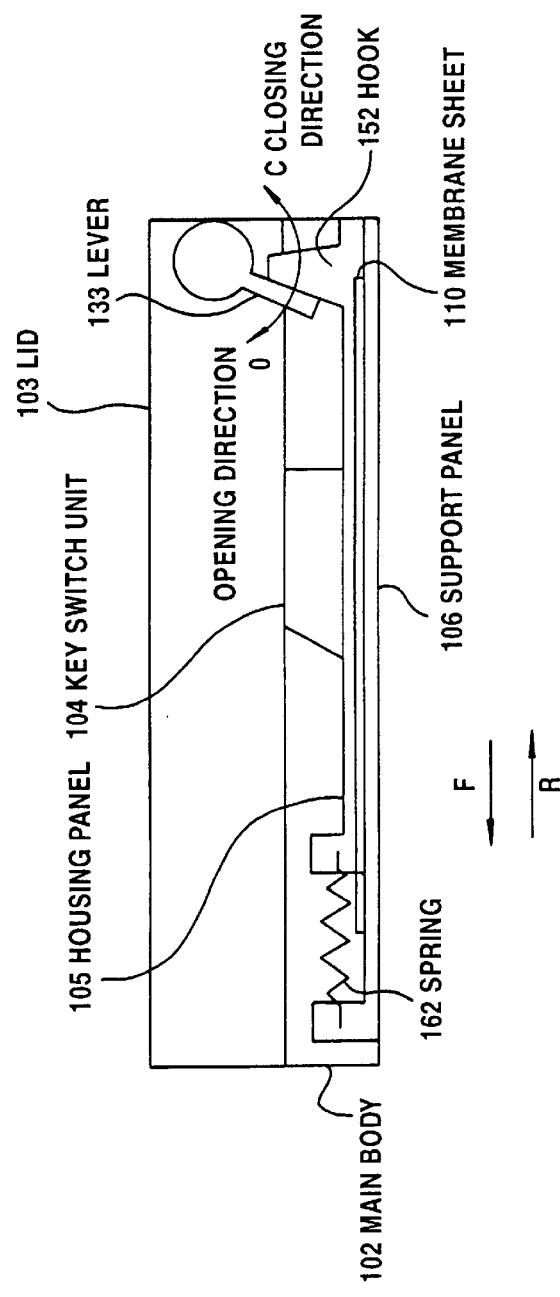

Positional transition of key top during opening the lid is hereinafter described. FIG. 24 schematically illustrates a cross-sectional view of the apparatus when the lid is closed. Main body 102 has a stack of a housing panel 105 provided with a hook 152 at rear end thereof, a membrane sheet 110 and a support panel 106. Lid 103 has a pusher lever 133 for rotatably pushing a hook 152.

Upon support panel 106 is membrane sheet 110, and further thereon is housing panel 105. Membrane sheet 110 is fixed to support panel 106, the substrate of the apparatus. Housing panel 106 is fixed to and pulled by a spring 162 toward L direction so as to be horizontally slidable upon membrane sheet 110. Consequently, housing panel 106 is always ready to horizontally move toward the F direction, however, is blocked by pusher lever 133 fixed to lid 103.

Figure 25:
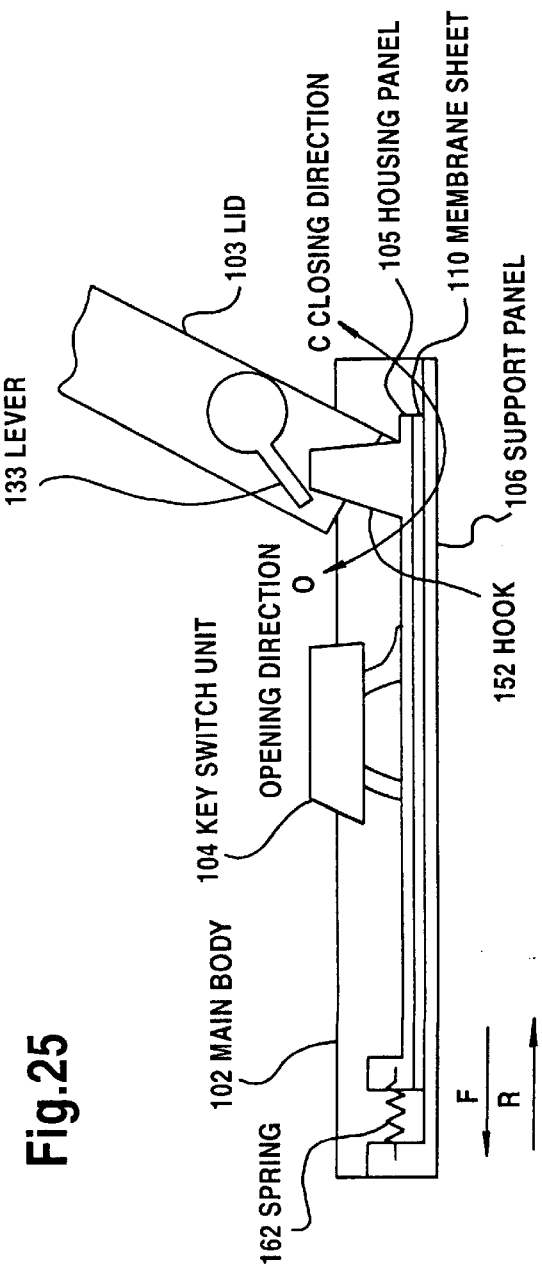

FIG. 25 schematically illustrates a cross-sectional view of the apparatus when the lid is opened. In opening lid 103 pusher lever 133 rotates along an opening direction denoted with "O". According to the rotation, hook 152 is horizontally moved toward F direction by the restoring force of spring 162.

In closing lid 103 pusher lever 133 rotates along a closing direction denoted with "C". According to the closing rotation, hook 152 is horizontally moved toward R direction. Consequently, housing panel 105 is moved toward R direction resisting the restoring force of spring 162 so as to return to the above-mentioned state where the lid is closed.

Figure 26:
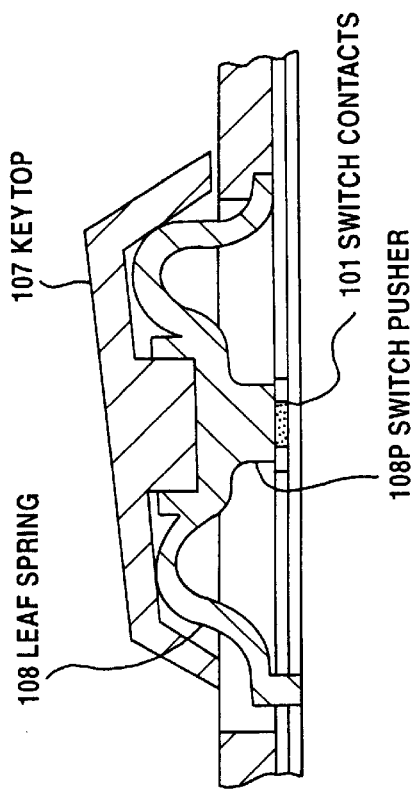

Key input motion of the pressed key switch is hereinafter described with reference to the perspective view of key switch unit shown in FIG. 21 and the cross-sectional view showing the pressed-down state in FIG. 26.

In FIG. 21, key top 107 is not pushed yet by a finger, etc. Accordingly, the key top is located at a top dead point.

Next, hereinafter is described the state where the upper surface of the key top is pressed down by a finger, etc. As seen in FIG. 26 showing the pressed state, key top 107 gradually descends, while resisting the elastic force of spring 108, so as to deform the center portion of the spring, and finally switch presser 108P pushes switch contacts 101 to close.

Consequently, the information of thus pushed key is electrically transmitted to a printed circuit board, which is not drawn in the figure. Then, if the finger is left from key top 107, key top 107 restores to the top dead point, i.e. the home position, after releasing switch contacts 101 by the elastic force of spring 108, so as to return again to the key switch unit shown in FIG. 21.

Though in the third preferred embodiment the height of the key tops are varied by horizontally shifting the housing panel, in order to solve the problem the solution is not limited to horizontally shift the housing panel but also may shift the support panel. Moreover, it is also possible to shift both the housing panel and the support panel along their opposing direction.

Though in the above preferred embodiments the mechanism to horizontally drive the slid panel or the housing panel by the rotation of the opening lid is respectively different, it is apparent that other measure than those recited in each preferred embodiment can be employed therein to move the the housing panel or the support panel.

Advantages of the structures of the above preferred embodiments are in that springs to push up the keys to the home position are not compressed except during the key input operaton, whereby the springs can be prevented from the deterioration of the spring function. Moreover, the switch contacts are not forced to be closed when the lid is closed, accordingly, the contacts are prevent from their fatigue. Furthermore, the movement of the housing unit linked to the opening/shutting motion of the lid allows an easy and conveniently thin portable apparatus.

Though in the above preferred embodiments only a single scheme to shift the keyboard is drawn in the figures, it is typical to provide two of them symmetric with respect to the position of the operator.

The many features and advantages of the invention are apparent from the detailed specification and thus, it is intended by the appended claims to cover all such features and advantages of the methods which fall within the true spirit and scope of the invention. Further, since numerous modifications and changes will readily occur to those skilled in the art, it is not detailed to limit the invention and accordingly, all suitable modifications and equivalents may be resorted to, falling within the scope of the invention.

What I claim is:

1. A keyboard comprising:
    a housing unit for slidably supporting a key top; and
    a support panel unit statically supporting a switch to be operated by said key top,
    wherein said housing unit can vertically and horizontally move between a first position apart from said support panel unit and a second position close to said support panel unit, and
    wherein said first position is such that said key top, when depressed, can operate said switch, and said second position is such that said key top, even if depressed, cannot operate said switch.

2. A keyboard as recited in claim 1, wherein said first position is such that said key top confronts said switch, and said second position is such that said key top is deviated from said position confronting said switch.

3. A keyboard as recited in claim 1 or claim 2, wherein said first position is such that said housing unit is vertically shifted from a main surface of said support panel, and said second position is such that said housing unit is horizontally shifted from said switch.

4. A keyboard comprising:
    a housing unit for carrying a key top, a support to slidably support said key top and an elastic member arranged between said support and said key top so as to be compressed by pushing down said key top; and
    a support panel unit statically supporting a switch to be operated by said key top,
    wherein said housing unit can vertically and horizontally move between a first position apart from said support panel unit and a second position close to said support panel unit.

5. A keyboard comprising:
    an elastic member for supporting a key top, said elastic member being shaped like an arch;
    a housing panel for supporting a first end of said arch;
    a switch to be pushed by said elastic member; and
    a support panel for holding said switch, and for supporting a second end opposite from said first end of said arch,
    wherein at least one of said housing panel and said support panel is movably supported so that said elastic member is elastically deformed for said key top and said switch to approach each other by said movement.

6. An information processing apparatus comprising:
    a main body for containing a keyboard, said keyboard comprising:
        a housing unit for slidably supporting a key top; and
        a support panel unit statically supporting a switch to be operated by said key top,
    wherein said housing unit can vertically and horizontally move between a first position apart from said support panel unit and a second position close to said support panel unit,
    wherein said first position is such that said key top, when slidably depressed, can operate said switch, and said second position is such that said key top, even if depressed, cannot operate said switch, and
    a lid including a display device on an inside wall thereof, and being capable of opening/closing from/to said main body via a hinge, one of said housing unit and said support panel unit being moved in accordance with said opening/closing motion to said lid.

7. The keyboard as recited in claim 1, wherein said switch is a membrane switch formed of two opposing insulative sheets and electrical contacts, each of said contacts being on said insulative sheets and insulatively facing each other.

* * * * *